United States Patent Office 3,031,437
Patented Apr. 24, 1962

3,031,437
VINYLIDENE FLUORIDE POLYMERS AND COPOLYMERS
Hyman Iserson, Erdenheim, Pa., assignor to Pennsalt Chemicals Corporation, Philadelphia, Pa., a corporation of Pennsylvania
No Drawing. Filed May 13, 1959, Ser. No. 812,797
5 Claims. (Cl. 260—87.7)

This invention relates to the polymerization of vinylidene fluoride. More particularly it relates to a process for preparation of polyvinylidene fluoride in latex form in an aqueous system in the presence of a perchlorobenzenecarboxylic acid or one of its salts as a dispersing agent and a water soluble peroxy compound as a polymerization initiator.

The polymerization of halogenated olefins to form stable aqueous dispersions with ordinary dispersing agents is often unsatisfactory, as is well-known. Ordinary dispersing agents, e.g. hydrocarbon soaps and other long-chained synthetic surfactants, either tend to inhibit the polymerization or cause chain transfer to form undesirably low molecular weight polymer which is unsuitable for purposes where a latex form of product is desired. In recent years, fluoroalkyl compounds, e.g. polyfluoroalkanoic acids, and perfluorochlorocarboxylic acids have been found useful as dispersing agents for the polymerization of halogenated olefins, permitting the preparation of latices of many of said olefins. However, these newer dispersing agents are not readily obtainable, are high in cost, and add considerably to the total cost of the polymer latex when used.

It has now unexpectedly been found that an entirely homogeneous, highly stable, latex of polyvinylidene fluoride can be prepared by use of relatively low cost materials, namely perchlorobenzenecarboxylic acids or their salts as dispersing agents in the polymerization of vinylidene fluoride in the presence of a water-soluble peroxy polymerization initiator in an aqueous medium.

This discovery is surprising in that these compounds do not have the structure generally associated with surfactants, that is, they do not have a long-chained hydrophobic portion. It is further surprising that the polymerization of the vinylidene fluoride is in no way inhibited by the presence of a perchlorobenzenecarboxylic acid or one of its salts in the polymerizer charged. The dispersing agents of the prior art discussed above all are long-chained aliphatic compounds not only having the type of molecule usually associated with a dispersing agent, but containing in addition fluorine atoms for added stability of the agent under the polymerization conditions.

Despite the absence of a long-chained hydrophobic group, the perchlorobenzenecarboxylic acids are highly efficient as dispersing agents for the preparation of polyvinylidene fluoride in latex form as may be seen from the examples below. Additionally, they are readily available, low-cost, materials for this purpose. Whereas the fluorine-containing dispersing agents of the prior art must be synthesized by special procedures, the perchlorobenzenecarboxylic acids are available as commercial products at a fraction of the cost.

The perchlorobenzenecarboxylic acids useful in the practice of this invention include particularly perchlorobenzoic acid, perchloro-1,2-benzenedicarboxylic acid, perchloro-1,3-benzene-dicarboxylic acid, and the perchloro-1,4-benzenedicarboxylic acid and the ammonium, sodium, potassium, and lithium salts of these acids. The sodium salt of perchloro-1,2-benzenedicarboxylic acid is preferably used.

The perchlorobenzenedicarboxylic acids are also commonly known as perchlorophthalic acids, i.e., perchloro-o-phthalic, perchloroisophthalic acid, and perchloroterephthalic acid. The salts of the dicarboxylic acids can be added to the polymerizer charge as salts or they can be prepared in situ in the polymerizer vessel by starting, for example, with a perchloro-o-phthalic anhydride and treating it with an aqueous solution of an inorganic base, e.g., sodium hydroxide, to form the corresponding salt, e.g. sodium perchloro-o-phthalate.

The perchlorobenzenecarboxylic acid dispersing agent is used in an amount at least in excess of 0.02% based on the weight of aqueous medium charged to the polymerizer. An amount from about 0.05% to about 5.0% has been found advantageous. A quantity of from 0.1% to 3% is preferably used.

The polymerization initiators used in the practice of the invention are free-radical producing initiators comprising water-soluble peroxy compounds, for example, inorganic peroxy compounds, e.g. ammonium persulfate, potassium persulfate, sodium persulfate, sodium carbonate peroxide, sodium pyrophosphate peroxide, and sodium perborate and water-soluble organic peroxides, e.g. disuccinic acid peroxide.

The peroxy compound is used in an amount at least in excess of 0.01% based on the weight of the vinylidene fluoride charged to the polymerizer throughout the run. Preferably, an amount from about .05% to about 10% is used. An amount from about 0.5% to 5% is especially preferred.

The polymerization steps are carried out in accordance with known general procedures at a wide range of pressures, but preferably below about 50 atmospheres. Pressures of from 10 to about 1000 atmospheres and temperatures from 0° C. to about 150° C. can be used. Pressures of about 25–60 atmospheres and temperatures of about 65° C. to about 90° C. are especially preferred.

In practicing the invention, distilled, deoxygenated water is charged to a purged polymerizer vessel and the dispersing agent and peroxy compound are then added. The vessel is heated to operating temperature. Vinylidene fluoride is then introduced to the polymerizer to a predetermined operating pressure and is added as needed to maintain a more or less constant pressure of monomer in the vessel. The rate of polymerization is observed by the consumption of monomer. Agitation of the reaction mass is used as is the general practice in the art.

The latices of polyvinylidene fluoride formed by use of the novel dispersing agents of this invention are highly stable latices consisting of particles less than one micron in size. The latices may be diluted with water to any desired dilution for a particular use. They can be used to form films of polyvinylidene fluoride. These films are useful in forming heat-stable, pest-proof, hermetic wrappers. The latices can be coagulated, for example by salting out by the addition of an aqueous solution of sodium chloride. The coagulated polyvinylidene fluoride is then washed and dried and is ready for fabrication by the usual procedures into extruded, molded or calendered products. The properties of these final products is in no way adversely affected by the presence of any residual amount of the perchlorobenzenecarboxylic acid dispersing agent or its salt.

The invention is more fully illustrated by the following examples in which the parts are by weight unless otherwise indicated.

*Example 1*

One part of perchloro-o-phthalic anhydride is added to 200 parts of water. The mixture is made slightly alkaline with 6 normal sodium hydroxide and charged into a stainless steel autoclave. 0.2 part of ammonium persulfate is added. The reactor is cooled in ice, evacuated and heated to 86° C. It is then pressured to 400 p.s.i.g. with vinylidene fluoride and agitated at about 86° C. for 35 minutes. During this period the pressure is held constant by addition of vinylidene fluoride. The autoclave is then vented and the reaction mixture removed. A latex of polyvinylidene fluoride in water is obtained. The latex is highly stable at ambient temperatures. Subjecting the latex to freezing conditions results in coagulation of only a small amount of the dispersed polymer. Melting the frozen latex and boiling it thereafter causes very little additional precipitation. Addition of methanol and boiling of the latex-methanol mixture are also ineffective as means of coagulation. The polymer, however, can be coagulated by addition of 5% aqueous sodium chloride to the latex followed by boiling of the mixture for several minutes. The coagulated polymer is then filtered, washed with hot water and dried. The dry weight is about 8 parts.

The dried polyvinylidene fluoride has a plasticity index number of about 1600. The plasticity number is an empirical index found useful for comparison of vinylidene fluoride polymers in the absence of a method for measuring molecular weight. The plasticity number is the area in square millimeters of a plaque made by pressing 0.5 g. of polyvinylidene fluoride at 2500 p.s.i.g. and 225° C. in a Carver press for one minute. The relationship between the area of the plaque and the apparent molecular weight is that as the molecular weight increases, the area of the plaque decreases. In other words, polymer having a low molecular weight will flow to form a larger-sized area than will polymer having a high molecular weight. Polymer having a low plasticity number is therefore indicated to be high in apparent molecular weight. Polymer having a plasticity number in the range 1500–3000 has been experimentally determined to be suited for fabrication purposes. Polymer having a plasticity number of 1800–2800 has optimum physical properties and is especially preferred.

Example 2

One part perchlorobenzoic acid is dissolved in 50 parts of deionized water which has also been deoxygenated by passing dry nitrogen through it while it is boiled for 30 minutes. Two-tenths part of potassium persulfate is then dissolved in this solution and 150 parts of deionized and deoxygenated water are added. The solution is then placed in a stainless steel autoclave which is then cooled below freezing point of the liquid and evacuated. The autoclave is shaken mechanically and heated to 80° C. It is then charged with vinylidene fluoride to a pressure of 400 p.s.i.g. A feed-line from the vinylidene fluoride source is connected to the autoclave through a reducing valve during the polymerization. After one-half hour the autoclave is removed from the shaker and unreacted vinylidene fluoride is vented off. There is found present an aqueous dispersion of polyvinylidene fluoride free of coagulated polymer. Rapid agitation of the dispersion in a high-speed blender for 15 minutes does not cause precipitation to occur, nor does the polymer coagulate on boiling. The polymer separates, however, when the dispersion is boiled with dilute solutions of sodium chloride, calcium chloride, ammonium chloride or sodium carbonate.

Example 3

Using the same equipment and procedure as in Example 2, vinylidene fluoride is polymerized in the presence of 200 parts of deionized deoxygenated water, 0.2 parts of disuccinic acid peroxide and 1 part of perchloroisophthalic acid. The polyvinylidene fluoride which is formed is in the form of stable latex.

Example 4

Using the same equipment and procedure as in Example 1, vinylidene fluoride is polymerized in the presence of 200 parts of deionized deoxygenated water containing 1 part ammonium persulfate and 1 part of perchloroterephthalic acid and made slightly alkaline with ammonium hydroxide. The polyvinylidene fluoride polymer is recovered in the form of a stable latex.

Many different embodiments of this invention can be made without departing from the scope and spirit of it, and it is to be understood that my invention includes also such embodiments and is not limited by the above description. Thus, although the above descriptions are directed to the homopolymer of vinylidene fluoride, the advantages of the invention accrue also when polymerizing mixtures consisting essentially of vinylidene fluoride but containing small amounts, i.e. up to about 5%, of other ethylenically unsaturated comonomers, for example ethylene or haloethylene, e.g. $CFCl=CFCl$, $CF_2=CFCl$, or $CF_2=CF_2$, and the polymerization of such mixtures containing 95 mole percent or more of vinylidene fluoride is also included within the scope of the invention.

I claim:

1. In a process for the polymerization of vinylidene fluoride with from 0 to about 5% of an ethylenically unsaturated comonomer selected from the group consisting of ethylene and haloethylene other than vinylidene fluoride in an aqueous medium in the presence of a water-soluble peroxy compound as a polymerization inhibitor, the improvement wherein said polymerization is carried out in the presence of from about 0.02% to about 5% by weight based on the weight of aqueous medium of a perchlorobenzene carboxylic acid selected from the group consisting of perchlorobenzoic acid, perchloro-o-phthalic acid, perchloroisophthalic acid, and perchloroterephthalic acid and the ammonium and alkali metal salts thereof as a dispersing agent, whereby polymer of vinylidene fluoride is obtained in the form of a stable latex.

2. The process according to claim 1 wherein the dispersing agent is perchloro-o-phthalic acid.

3. The process according to claim 1 wherein the dispersing agent is a sodium salt of perchloro-o-phthalate.

4. The process according to claim 1 wherein the dispersing agent is an ammonium salt of perchloroterephthalic acid.

5. The process according to claim 1 wherein the dispersing agent is perchloroisophthalic acid.

References Cited in the file of this patent

UNITED STATES PATENTS 2,816,082   Brinker et al. _____ Dec. 10, 1957

OTHER REFERENCES

Lawlor: Ind. Eng. Chem., 39 1419–26 (1947).